United States Patent [19]

Batlaw et al.

[11] Patent Number: 5,919,846
[45] Date of Patent: Jul. 6, 1999

[54] COLORANT HAVING ISOCYANATE SUBSTITUENT

[75] Inventors: Raj Batlaw, Spartanburg; John W. Miley, Campobello, both of S.C.

[73] Assignee: Milliken Research Corporation, Spartanburg, S.C.

[21] Appl. No.: 09/025,824

[22] Filed: Feb. 19, 1998

[51] Int. Cl.$^6$ .................................................. C08G 18/02
[52] U.S. Cl. ..................... 524/83; 106/31.27; 106/31.43; 106/31.44; 106/31.57; 523/160; 101/491; 534/558; 534/789; 552/101; 552/208; 552/301; 552/302; 549/388; 546/102; 546/152
[58] Field of Search ............... 106/31.27, 31.43, 106/31.44, 31.57; 523/160; 101/491; 534/558, 789; 552/101, 208, 302, 301; 549/388; 546/152, 102; 540/122; 544/3, 63, 224; 548/146; 428/423.1, 425.1; 427/389.9, 393.5; 524/83, 88, 89, 92, 96, 100, 110, 198

[56] References Cited

U.S. PATENT DOCUMENTS

| | | | |
|---|---|---|---|
| 4,284,729 | 8/1981 | Cross et al. | 521/158 |
| 5,021,502 | 6/1991 | Allred | 346/1.1 |
| 5,026,755 | 6/1991 | Kveglis et al. | 524/389 |
| 5,176,745 | 1/1993 | Moore et al. | 106/22 |
| 5,194,463 | 3/1993 | Krutak et al. | 524/35 |
| 5,198,022 | 3/1993 | Aulick et al. | 106/22 K |
| 5,389,130 | 2/1995 | Batlaw et al. | 106/20 R |
| 5,589,522 | 12/1996 | Beach et al. | 523/160 |
| 5,605,976 | 2/1997 | Martinez et al. | 525/408 |
| 5,611,847 | 3/1997 | Guistina et al. | 106/20 R |
| 5,616,678 | 4/1997 | Beckmann et al. | 528/73 |
| 5,626,655 | 5/1997 | Pawlowski et al. | 106/31.27 |
| 5,637,637 | 6/1997 | Sharma et al. | 524/502 |
| 5,637,638 | 6/1997 | Chandler et al. | 524/591 |

FOREIGN PATENT DOCUMENTS 769509   4/1997   European Pat. Off. .

OTHER PUBLICATIONS

Chapter 12, "Ink–Jet Inks", *The Printing Inks Manual*, 5th Edition, Blueprint, pp. 683–687 (1993).

*Primary Examiner*—Rachel Gorr
*Attorney, Agent, or Firm*—Terry T. Moyer; William S. Parks

[57] ABSTRACT

A novel colorant compound is provided which is the addition product of an organic chromophore having at least one reactive hydroxyl or amine substituent, a polyisocyanate, and a carboxylic acid, sulfonic acid, or salt of either thereof. The polyisocyanate, added in a molar excess relative to the number of such reactive substituents, reacts with the reactive hydroxyl or amine groups to provide terminal isocyanate groups. Subsequently, the carboxylic acid or salt thereof, also added in an amount excessive in relation to the number of terminal isocyanate groups, reacts therewith to from urethane moieties on the colorant. Such a compound provides excellent ink compositions upon dilution and are very soluble within all the standard ink diluents. Furthermore, such colorants provide good jettability, waterfastness, washfastness, and the like, within ink-jet applications on various types of printing substrates. A method for producing such a colorant and specifically printed substrates colored therewith is also provided.

21 Claims, No Drawings

COLORANT HAVING ISOCYANATE SUBSTITUENT

FIELD OF THE INVENTION

This invention is directed to a compound which is the addition product of a chromophore and an isocyanate, wherein the isocyanate has a carboxyl containing group bonded thereto. The compound may be incorporated in a composition useful for printing on or dyeing a substrate. A methods for producing this novel colorant, as well as substrates specifically printed therewith, are also provided.

DISCUSSION OF THE PRIOR ART

In general, when applying a colorant or colorant composition to a substrate, it is desirable to "fix" the colorant to the substrate, such as by chemical or physical bonding, or combination thereof. The method used to apply the colorant or colorant composition imposes a number of requirements on the colorant compound, such as solubility, dispersability, stability and reactivity with the substrate.

Examples of colorants having substituent groups intended to tailor the properties of the colorant may be found in the following references. Moore et al., U.S. Pat. No. 5,176,745, disclose a poly(oxyalkylene) substituted colorant reacted with a cyclic anhydride such as an alkenyl succinic anhydride, providing a free carboxyl group. The colorant may be made water-soluble by adding a suitable counter ion. Sharma et al., U.S. Pat. No. 5,637,637, disclose a waterborne copolymeric colorant composition prepared by emulsion polymerization of a dye having a reactive vinyl group and a vinyl monomer, such as styrene.

A colorant compound having polymer or pre-polymer substituent groups may be synthesized by the reaction of a colorant and a polyisocyanate as disclosed in Cross et al., U.S. Pat. No. 4,284,729; Krutak et al., U.S. Pat. No. 5,194,463; and Beckmann et al., U.S. Pat. No. 5,616,678.

Ink compositions containing polyurethane substituted colorants have been disclosed. Chandler et al., U.S. Pat. No. 5,637,638, provide a waterborne polyurethane-urea derived colorant intended to be easily erasable from a cellulosic substrate such as paper. Tektronix, Inc., EP 0 769 509 A, disclose a non-erasable ink jet composition containing a colored polyurethane dispersion formed by the resin of at least one polyol, at least one polyisocyanate, at least one internal surfactant and at least one reactive colorant. The dispersion contains particles ranging in size from 0.01 to 5.0 microns.

Despite the previous work done in the field of colorants, there remains an unfulfilled need for a colorant having improved solubility, fastness and stability characteristics.

SUMMARY OF THE INVENTION

Therefore, an object of the invention is to provide a colorant which is soluble in a wide range of organic and aqueous compositions. Another object of the invention is to provide a colorant which is useful for coloring textiles, including synthetic fibers, films and paper products. Yet another object of the invention is to provide a colorant which will have good water fastness and wash fastness when applied to such substrates.

A further object of the invention is to provide an ink composition which is suitable for use in a wide range of ink-jet printing methods, including bubble jet, piezo and hot-melt type printers, as well in gravure printing processes.

A still further object of the invention is to provide a process for manufacturing such colorants, which is both economical and results in uniform production.

Accordingly, a colorant is provided which is a compound comprising the addition product of (a) an organic chromophore having at least one reactive hydroxyl or amine substituent group;

(b) a polyisocyanate; and (c) a carboxylic acid, or sulfonic acid, or the salts thereof;

wherein said polyisocyanate reacts with each of said reactive hydroxyl or amine substituent groups to form isocyanate terminal groups on said organic chromophore and, subsequently, said carboxylic acid, sulfonic acid, or corresponding salt thereof, reacts with said isocyanate terminal groups to form urethane moieties on the resulting compound.

DETAILED DESCRIPTION OF THE INVENTION

Without limiting the scope of the invention, the preferred embodiments and features are hereinafter set forth. Unless otherwise indicated, all parts and percentages are by weight, conditions are ambient, e.g. one atmosphere of pressure and 25° C., and average molecular weight is based on number-average molecular weight ($M_n$).

The terms aryl and arylene are intended to be limited to single and fused double-ring aromatic hydrocarbons. Unless otherwise specified, aliphatic hydrocarbons are from 1 to 12 carbon atoms in length and cycloaliphatic hydrocarbons comprise from 3 to 8 carbon atoms.

All of the patents cited in the specification are hereby incorporated by reference.

The colorant composition of the present invention may be characterized as the addition product of an (i) an organic chromophore; (ii) a polyisocyanate; and (iii) a carboxylic acid, or sulfonic acid, or either of the salts thereof.

Suitable organic chromophores are those having substantial color in the infrared, visible or ultraviolet range of the electromagnetic spectrum. Virtually any organic chromophore may be employed in the invention, including those in the following classes: azo, including polyazo, diphenylmethane, triarylmethane, xanthene, methine, including polymethine, acridine, quinoline, thiazole, indamine, indophenol, azine, oxazine, thiazine, anthraquinone, indigoid and phthalocyanine chromophores. Preferred chromophores are azos, triarylmethanes, xanthenes, methines, and phthalocyanines.

The organic chromophore has at least one nucleophilic functionality, capable of undergoing an addition reaction with an isocyanate group. Suitable nucleophilic groups include hydroxy, amino and thio groups, preferably hydroxy and primary amine groups. The organic chromophore may comprise five or more of such nucleophilic functionalities, with one to four being typical.

The nucleophilic group may be bonded directly to an aromatic or heterocyclic component of the organic chromophore or by a divalent linking group, for examples, an aliphatic group. Representative organic chromophores may be found in the *Colour Index*, Third Edition, published by The Society of Dyers and Colourists (1971), and Krutak et al., U.S. Pat. No. 5,194,463.

Alternatively, the nucleophilic functionality may be bonded to a poly(oxyalkylene) substituent group of the organic chromophore. The poly(oxyalkylene) substituent may be characterized as a straight or branched chain of from 2 to 200 residues of $C_2$–$C_4$ alkylene oxides, predominately ethylene oxide and propylene oxide residues. Minor amounts of glycidol, butylene oxide and other compatible monomers may also be incorporated into the substituent. For example, glycidol monomers may be incorporated into the poly(oxyalkylene) substituent to promote branching. When enhanced branching is desired, preferably from 2 to 10 glycidol units are provided per poly(oxyalkylene) chain. In a preferred embodiment, the poly(oxyalkylene) substituents are primarily comprised of from 2 to 75, most preferably 4 to 35, residues of ethylene oxide, propylene oxide or random and block copolymers thereof.

The poly(oxyalkylene) substituent may be covalently bonded to the organic chromophore by a suitable divalent or trivalent group, for example, N, NR, O, S, $S_2$, $SO_2N$, $SO_2NR$, $CO_2$, CON or CONR, where R is H, $C_1$–$C_{12}$ alkyl, phenyl or benzyl. Preferably, the linking group is N, NR, O, $SO_2N$ or $SO_2NR$. Two poly(oxyalkylene) substituents may be bonded to the organic chromophore through a trivalent linking group.

The general procedure for synthesizing poly(oxyalkylene) substituted organic chromophores having nucleophilic functionalities is known to those skilled in the art and may be found in the following references: Cross et al., U.S. Pat. No. 4,284,729; Kluger et al., U.S. Pat. No. 5,240,464; Kluger et al., U.S. Pat. No. 5,270,363; Moody et al., U.S. Pat. No. 5,290,921 and Machell et al., U.S. Pat. No. 5,231,135.

The organic chromophore reacts with an isocyanate group of a polyisocyanate to form, for example, a urethane, urea or thiourea bond. Preferably, the polyisocyanate has from 2 to 2.5 NCO functionalities per molecule, and most preferably is a diisocyanate. By way of example, the polyisocyanate may be selected from: 2,4-toluene diisocyanate, 2,6-toluene diisocyanate, mixtures of 2,4- and 2,6-toluene diisocyanate, 4,4'-biphenylene diisocyanate, 2,2'-diphenylmethane diisocyanate, 4,4'-diphenylmethane diisocyanate, 2,4'-diphenylmethane diisocyanate, tetramethyl-m-xylene diisocyanate, p-xylene diisocyanate, methylenedi-p-phenyl diisocyanate, m-phenylene diisocyanate, p-phenylene diisocyanate, hexamethylene diisocyanate, isophorone diisocyanate, 4,4'-diisocyanatodiphenyl ether, bis(4-isocyanatophenyl)sulfone, isopropylidene bis(4-phenyl isocyanate), naphthalene-1,5-diisocyanate, 1-chloro-2,4-phenylene diisocyanate, 3,3'-bitolylene-4,4'-diisocyanate, 3,3'-dimethoxy-4,4'-biphenylene diisocyanate, 3,3'-dichloro-4,4'-biphenylene diisocyanate, 2,2',5,5'-tetramethyl-4,4'-biphenylene diisocyanate, diphenylethane-4,4'-diisocyanate, dicyclohexylmethane-4,4'-diisocyanate, and the like.

The third main component of the colorant compound is a carboxylic acid, sulfonic acid, or salt thereof, which has a nucleophilic functionality capable of undergoing an addition reaction with an isocyanate group. For example, alcohols or amines comprising pendant or terminal carboxyl groups may be employed. Monocarboxylic acids or salts thereof are preferred, however, di- or tri-carboxylic acids or salts thereof are also possible. By way of example, the carboxylic acid/salt may be selected from aliphatic or aromatic alcohols and amines, including glycolic acid, imino diacetic acid, hydroxybenzoic acid, hydroxybenzene sulfonic acid, isethionic acid, lithocholic acid, syringic acid, 2,4,5-trichlorophenoxyacetic acid, 4-hydroxybenzoic acid, 5-hydroxyanthranilic acid, 2-hydroxyisobutyric acid, 5-hydroxyisophthalic acid, 1-naphthol-3,6-disulfonic acid, 4-hydroxy-1-naphthalene sulfonic acid, 3-hydroxy-2-naphthoic acid, 8-hydroxyquinoline-5-sulfonic acid, hydroxylamine-o-sulfonic acid, hydroxymethanesulfinic acid, 3-allyloxy-2-hydroxy-1-propane sulfonic acid, 4-hydroxyanthranilic acid, or any mixtures thereof.

A counter ion to the carboxylic acid or sulfonic acid may be provided to convert the colorant compound to a salt form which is soluble in an aqueous composition. As used herein, the colorant compound is considered to be water-soluble, if it has a solubility in water of at least 1,000 ppm. Suitable counter ions include alkali metal ions, alkaline earth metal ions, zinc ammonium complexes, ammonium ions and amine salts such as salts of morpholine. Especially useful are ammonium ions which may optionally be substituted with from 1 to 3 groups selected from $C_{1-18}$ alkyl, $C_{2-18}$ hydroxy alkyl, phenol and alkylphenol, wherein the alkyl portion is $C_{1-4}$, for example, amine salts of ethanolamine, diethanolamine and triethanolamine.

These inventive colorants provide excellent stability within ink solutions, including those which are aqueous in nature. Also, the inventive colorants are extremely washfast, waterfast, and colorfast, and provide pleasant, permanents colorations to a number of substrates, including paper and fabric. Screen printing and pad dyeing, followed by heat curing, can easily be used to transfer such inks to such substrates. Furthermore, the liquid state of the colorants provides a non-precipitating formulation for ink-jet printers and allows digital printing on paper, film, and fabric substrates.

One skilled in the art can easily synthesize the inventive colorants through reactions between a chromophore, an isocyanate, and a carboxylic acid or a sulfonic acid, or salt of either thereof. Generally, this method entails a two-step process wherein first the chromophore reacts with the isocyanate to form an isocyanate-terminated molecule. Subsequently, the molecule is reacted with carboxylic acid in order to produce a urethane terminal group on the colorant. The isocyanate is added in an amount in excess of twice the molar equivalent of the number of reactive hydroxyl or amino groups on the chromophore to ensure each reactive group forms a urethane/urea bond and the molecule has terminal isocyanate groups. The carboxylic or sulfonic acid, or salt of either thereof, is then added in excess of the molar equivalent of the number of terminal isocyanate groups on the molecule to ensure all of such terminal groups have been reacted. This is accomplished primarily by monitoring the isocyanate peak of the molecule within the IR spectrum until it disappears. The resulting product is then neutralized with an amine or a base.

Ink compositions comprising according to this invention are produced generally and preferably by diluting the inventive colorants to a level of between 0.01 and 90%. The colorants may be used in their pure, undiluted, liquid form if desired, but such a manner of use is not necessarily encouraged. Generally, especially within ink-jet applications, the inventive colorant is diluted with a number of solvents. These include water, ketones, acetates, glycols, glycol ethers, alcohols (including aliphatic or aromatic alcohols or polyols), or mixtures of these solvents. Preferably the ink solutions are diluted with organic, non-aqueous solvents, such as diethylene glycol, dipropylene glycol, methyl ethyl ketone, and any other standard ink-jet diluent or mixture of diluents. However, it is also possible to dilute the colorant with water alone, such as for a bubble jet ink, or a water/water-miscible solvent system, such as polyvinyl alcohol in water, for example, prior to use. Preferably, also, the final wt % of the colorant within the ink composition is from about 0.1 to about 25% of the total composition. Most preferably, this level is from about 1.0 to about 10%.

Conventional binders and surfactants are also contemplated within the inventive ink compositions. Preferred as surfactants are anionic, sulfonated agents. Surfynol 465, available from Air Products is preferred, from about 0 to 7 wt % of the entire composition. Nonionic, cationic, and amphoteric surfactants may also be used depending on the application. Binders are present to control the viscosity of the composition, promote droplet formation within an ink-jet process, adhere the colorant to the surface of the substrate, control the gloss of the colorant, control the definition of the print of the colorant, and determine the alkali solubility of the ink, among other purposes. Any standard binders may be utilized, such as phenolic resins, block or graft copolymers of acrylics, polyamides, and the like, or amine-based polymers, specifically those available from Texaco™ under the designation Jeffamine®. Such binders are present in amount from about 0.1 to about 10.0 wt % of the entire composition. Other standard ink composition additives are also contemplated within this invention, such as pH adjusters, viscosity modifiers, and the like. Such binders, surfactants, and other additives include those taught within Chapter 12, Ink-Jet Inks, *The Printing Ink Manual*, 5th Edition, Blueprint, pp. 683–87 (1993).

The inventive colorant, as well as the inventive process of its production, provides numerous advantages within the art, including decreasing the ability of the dye molecule from polymerizing during the reaction and while in storage. There are substantially no reactive groups which can be attacked either electrophilically or nucleophilically causing polymerization or degradation since a great majority of the reactive sites on the molecule are capped with neutralized carboxylic acid moieties. This decrease in polymerization thus prevents dimerization and trimerization, in turn preventing great discrepancies in the solubility of the entire colorant composition. Also, this non-polymerizing composition thus retains a low molecular weight distribution (as merely one non-limiting example, this average weight may be lower than 5,000). Such a characteristic provides better jettability through an ink jet since the composition's low molecular weight allows drop break-up and prevents deposition and nozzle clogging in the printer head.

The inventive colorants may be utilized to color or print a number of substrates, including textiles, films, and paper. Textile substrates for this colorant include natural and man-made fabrics such as cotton, polyester, cotton/polyester blends, nylon-6, nylon-6,6, ramie, acetate, and the like. Suitable films for printing or coloring include polyolefins, such as polypropylene and polyethylene, polyurethanes, polyesters, and the like. Suitable paper substrates include cellulose-based sheets, either coated or uncoated, of any bond, and the like.

One particular distinct advantage obtained through the utilization of the inventive water-soluble compound is its ability to color textile substrates upon contact with the substrate surface in the presence of a relatively low temperature heat source. The addition of the carboxylic or sulfonic acid terminal groups provides water solubility to the inventive colorants in their salt forms. An unexpected benefit from such water-soluble colorants is that they are easily cleaved into their separate isocyanate and hydroxyl containing components upon exposure to a source of heat of a relatively low temperature but which is sufficient to effectuate such a cleavage. These free terminal isocyanate groups then facilitate dyeing or printing on the textile substrate by bonding or cross-linking the colorant onto the substrate surface. Temperatures sufficient to cleave the urethane moities, and thus effectively fix the inventive compound to the surface of a textile, range from about 125° F. to about 400° F., for between about 1 minute to about 1 hour. Preferred temperatures range from 175° F. to about 300° F. and preferred time periods for contact at such a temperature range from about 1 minute to about 20 minutes.

Furthermore, this unexpected beneficial behavior of the inventive colorant when exposed to a heat source is not limited to the water-soluble form of the colorant; the acid form also exhibits such properties.

Preferred Embodiment of the Invention

Preferably, the inventive colorant conforms to formula (I), listed below:

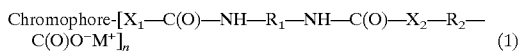

$$\text{Chromophore-}[X_1-C(O)-NH-R_1-NH-C(O)-X_2-R_2-C(O)O^-M^+]_n \quad (1)$$

wherein "chromophore" is an organic chromophore, as described above, and may include at least one substituted group, such as a poly(oxyalkylene) moiety, as described above; $X_1$ and $X_2$ are independently selected from oxy and imino groups; $R_1$ is selected from alkylene and arylene groups; $R_2$ is an alkylene group; $M^+$ is H or a counter ion, as described above; and n is 1–4. The particularly preferred polyisocyanate utilized in producing this compound is polydiisocyanate, in particular tetra methyl xylene diisocyanate and isophorone diisocyanate. The preferred carboxylic or sulfonic acids utilized in making this inventive compound are alcohol- or amine-based acids, and are most preferably glycolic acid, citric acid, or imino diacetic acid. Counter ions which are preferred include alkanolamines, and particularly dimethylethanolamine.

The following examples are indicative of the preferred embodiments, the compounds, compositions and methods, of the present invention:

COLORANT SYNTHESIS

EXAMPLE 1

54.3 parts of a polymeric methine yellow colorant, oxirane, methyl-, polymer with oxirane, ether with ethyl 3-[4-[bis(2-hydroxyethyl)amino-2-methylphenyl]-2-propenoate (2:1), having a Color Value of 58, was charged into a 3-neck flask. Added to this formulation was 44 parts of tetra methyl xylene diisocyanate (TMXDI, available from Cytec Industries) and 4 parts of dibutyltin dilaurate (catalyst) in 1-methyl-2-pyrrolidinone. The entire mixture was then heated to 70–80° C. for 2 to 6 hours or until all the hydroxyl groups reacted completely leaving an isocyanate terminated colorant. Subsequently, 15.8 parts of glycolic acid were charged to the flask and the reaction continued for 20 more hours at 70–80° C. or until all of the isocyanate peak, as measured by IR spectroscopy, had disappeared, leaving a carboxylic acid terminated polymeric colorant. The product was then neutralized with dimethylethanolamine to a pH of 7.5–8.5, ultimately forming a water-soluble colorant having a $\lambda_{max}$ of 437.

EXAMPLE 2

The same procedure was followed as in EXAMPLE 1 except that 27.7 parts of imino diacetic acid were charged to the flask instead of glycolic acid. The resulting polymeric colorant was also neutralized to a pH of 7.5–8.5 and had a $\lambda_{max}$ of 437.

EXAMPLE 3

The same procedure was followed as in EXAMPLE 1 except that 11.8 parts of glycolic acid and 3.5 parts of dimethylol propionic acid were charged to the flask instead of only glycolic acid. Again, the colorant was neutralized with dimethylethanolamine to a pH of 7.5–8.5 and had a $\lambda_{max}$ of 437.

EXAMPLE 4

142 parts of a polymeric blue colorant, methylium, bis(4-aminophenyl)(2-sulfophenyl)-, chloride, sodium salt, ethoxylated, propoxylated, having a Color Value of 50, was charged to a 3-neck flask. Added to this formulation was 38.2 parts of isophorone diisocyanate, available from Aldrich, and 4 parts of dibutyltin dilaurate (catalyst) in 1-methyl-2-pyrrolidinone. The entire mixture was then heated to 70–80° C. for 2–6 hours or until all the hydroxyl groups reacted completely leaving an isocyanate terminated molecule. Subsequently, 15.8 parts of glycolic acid were charged to the flask and the reaction continued for 20 more hours at 70–80° C. or until all of the isocyanate peak, as measured by IR spectroscopy, had disappeared, leaving a carboxylic acid terminated polymeric colorant. The product was then neutralized with dimethylethanolamine to a pH of 7.5–8.5, ultimately forming a water-soluble colorant having a $\lambda_{max}$ of 629.

EXAMPLE 5

82.6 parts of a polymeric red colorant, oxirane, methyl-, polymer with oxirane, ether with 2,2'-[[3-methyl-4-[(4-methyl-2-benzothiazolyl)azo]phenyl]imino]bis[ethanol] (2:1), having a Color Value of 40, was charged into a 3-neck flask. Added to this formulation was 44 parts of TMXDI (diisocyanate) and 4 parts of dibutyltin dilaurate (catalyst) in 1-methyl-2-pyrrolidinone. The entire mixture was then heated to 70–80° C. for 2–6 hours or until all the hydroxyl groups reacted completely leaving an isocyanate terminated molecule. Subsequently, 39.9 parts of citric acid were charged to the flask and the reaction continued for 20 more hours at 70–80° C. or until all of the isocyanate peak, as measured by IR spectroscopy, had disappeared, leaving a carboxylic acid terminated polymeric colorant. The product was then neutralized with dimethylethanolamine to a pH of 7.5–8.5, ultimately forming a water-soluble colorant having a $\lambda_{max}$ of 521.

EXAMPLE 6

20 parts of Jeffamine® 400, available from Texaco, were charged into a 3-neck flask. Added to this was 32 parts of TMXDI (diisocyanate), 0.5 parts of dibutyltin dilaurate, and 50 parts of 1-methyl-2-pyrrolidinone. The entire mixture was then heated to 60–70° C. for 4 hours or until measurements of the IR spectrum indicated total amine consumption. Then 39.4 parts of a polymeric methine yellow colorant in EXAMPLE 1 were charged to the 3-neck flask with 0.4 parts of a dibutyltin dilaurate catalyst. That mixture was then heated to 70–80° C. for 12 hours or until all the hydroxyl group reacted completely and leaving an isocyanate terminated molecule. Subsequently, 11.4 parts of glycolic acid were charged to the flask and the reaction continued for 20 more hours at 70–80° C. or until all of the isocyanate peak, as measured by IR spectroscopy, had disappeared, leaving a carboxylic acid terminated polymeric colorant. The product was then neutralized with dimethylethanolamine to a pH of 7.5–8.5, ultimately forming a colorant having a $\lambda_{max}$ of 437.

INK PREPARATION

EXAMPLE 7

20 parts of the colorant produced in EXAMPLE 1 were charged to a flask. Added to this colorant were 10 parts of diethylene glycol, 0.5 parts of Surfynol 465, a surfactant, 4 parts of 1-methyl-2-pyrrolidinone, and 65.5 parts of deionized water. The flask was then placed in a sonicator until a clear solution was obtained.

EXAMPLE 8

30 parts of the colorant produced in EXAMPLE 4 were charged to a flask. Added to this colorant were 10 parts of diethylene glycol, 0.5 parts of Surfynol 465, 4 parts, of 1-methyl-2-pyrrolidinone, and 55.5 parts of deionized water. The flask was placed in a sonicator until a clear solution was obtained.

EXAMPLE 9

22 parts of the colorant prepared in EXAMPLE 5 were charged to a flask. Added to this colorant were 10 parts of diethylene glycol, 0.5 parts of Surfynol 465, 4 parts of 1-methyl-2-pyrrolidinone, and 63.5 parts of deionized water. The flask was then placed in a sonicator until a clear solution was obtained.

EXAMPLE 10

20 parts of the colorant prepared in EXAMPLE 6 were charged to a flask. Added to this colorant were 10 parts diethylene glycol, 0.5 parts of Surfynol 465, 4 parts of 1-methyl-2-pyrrolidinone, and 65.5 parts of deionized water. The flask was then placed in a sonicator until a clear solution was obtained.

EXAMPLE 11 (Comparative)

7 parts of Reactive Red 2 were charged to a flask. To this was added 20 parts of diethylene glycol, 1 part of Surfynol 465, 5 parts of 1-methyl-2-pyrrolidinone, and 67 parts of water. The flask was then placed in a sonicator until a clear solution was obtained.

EXAMPLE 12 (Comparative)

7 parts of Reactive Yellow 3 were charged to a flask. To this was added 20 parts of diethylene glycol, 1 part of Surfynol 465, 5 parts of 1-methyl-2-pyrrolidinone, and 67 parts of water. The flask was then placed in a sonicator until a clear solution was obtained.

EXAMPLE 13 (Comparative)

7 parts of Reactive Blue 7 were charged to a flask. To this was added 20 parts of diethylene glycol, 1 part of Surfynol 465, 5 parts of 1-methyl-2-pyrrolidinone, and 67 parts of water. The flask was then placed in a sonicator until a clear solution was obtained.

EXAMPLE 14 (Comparative)

4 parts of Acid Blue 9 were charged to a flask. To this was added 20 parts of diethylene glycol, 1 part of Surfynol 465, 5 parts of 1-methyl-2-pyrrolidinone, and 70 parts of water. The flask was then placed in a sonicator until a clear solution was obtained.

EXAMPLE 15 (Comparative)

4 parts of Acid Red 52 were charged to a flask. To this was added 20 parts of diethylene glycol, 1 part of Surfynol 465, 5 parts of 1-methyl-2-pyrrolidinone, and 70 parts of water. The flask was then placed in a sonicator until a clear solution was obtained.

EXAMPLE 16 (Comparative)

4 parts of Reactive Red 2 were charged to a flask. To this was added 20 parts of diethylene glycol, 1 part of Surfynol 465, 5 parts of 1-methyl-2-pyrrolidinone, and 70 parts of water. The flask was then placed in a sonicator until a clear solution was obtained.

INK TESTING

Textile Dyeing/Printing

Each of the inks produced in EXAMPLEs 7–13 were filtered through a 1 micron filter paper then subsequently pad dyed separately onto two fabric substrates: 100% cotton and 100% polyester. The printed fabrics were cured in an oven at 350° C. for 30 minutes, except for the 100% cotton fabric which was cured for only 15 minutes. The cured fabrics were then tested for washfastness by performing a series of 5 washes in warm water with Tide® powder detergent in a conventional household washing machine. Washfastness is measured as the function of % color wash-off in the wash water. Also, the optical density was measured for each test fabric and such measurements were obtained on an X-rite 980 spectrophotometer. Jettability was evaluated by printing with these inks on paper with a Hewlett packard 682C. The results for these tests on 100% cotton, are tabulated below:

TABLE 1

Optical Density and Washfastness on 100% Cotton and Jettability

| Ink Composition | Optical Density Pre-Wash | Optical Density Post-Wash | Washfastness or % Color Retention | Jettability |
| --- | --- | --- | --- | --- |
| EXAMPLE 7  | 0.72 | 1.18 | >90% | GOOD |
| EXAMPLE 8  | 0.77 | 0.89 | >90% | GOOD |
| EXAMPLE 9  | 1.20 | 1.20 | >90% | GOOD |
| EXAMPLE 10 | 0.70 | 1.10 | >90% | GOOD |
| EXAMPLE 11 | 1.20 | 0.80 | 67%  | POOR |
| EXAMPLE 12 | 1.10 | 0.80 | 73%  | POOR |
| EXAMPLE 13 | 0.80 | 0.50 | 63%  | POOR |

The inventive colorants within the ink compositions of EXAMPLE 7–10 thus exhibited better color retention, and better jettability than those within Comparative EXAMPLEs 11–13.

Washfastness is a function of the percent color wash-off within wash water. EXAMPLEs 7–9 were also tested for washfastness from the 100% cotton and 100% polyester fabrics. The percent color wash-off, known as $\Delta E$ is calculated by the following equation:

$$\Delta E = ((\Delta L)^2 + (\Delta a)^2 + (\Delta b)^2)^{1/2}$$

wherein $\Delta E$ represents the difference in color between the initial pre-washed sample and the sample after washing. $\Delta L$, $\Delta a$, and $\Delta b$ represent the change within the color coordinates; wherein L is a measure of the lightness and darkness of the fabric; a is a measure of the redness or greenness of the fabric; and b is a measure of the yellowness or blueness of the fabric. The results are tabulated below:

TABLE 2

Calculation of $\Delta E$ of each Colored Fabric

| Ink Composition | $\Delta L$ | $\Delta a$ | $\Delta b$ | $\Delta E$ |
| --- | --- | --- | --- | --- |
| EXAMPLE 7: COTTON    | -0.33 | -1.89 | -6.31 | 6.59 |
| EXAMPLE 7: POLYESTER | -0.94 |  0.90 |  2.38 | 2.71 |
| EXAMPLE 8: COTTON    |  2.60 |  0.69 |  1.89 | 3.29 |
| EXAMPLE 8: POLYESTER | -1.66 |  0.08 | -0.22 | 1.67 |
| EXAMPLE 9: COTTON    | -1.22 |  1.21 |  2.66 | 3.17 |
| EXAMPLE 9: POLYESTER | -3.20 |  3.32 |  3.04 | 5.53 |

Such low values of $\Delta E$ for each of these samples corresponds to values of 4 and higher by the AATCC 61-2A Colorfastness Properties to Washing Test Method. By the same Method a value of 3 is considered passing.

One further run of tests was performed on eight separate types of fabrics for optical density measurements. The ink compositions of EXAMPLEs 7–9 were applied to each of the listed fabric substrates. The results were as follows:

TABLE 3

Optical Density Measurements on Various Fabrics

| | EXAMPLE 7 | | EXAMPLE 8 | | EXAMPLE 9 | |
| --- | --- | --- | --- | --- | --- | --- |
| Fabric | Pre-Wash | Post-Wash | Pre-Wash | Post-Wash | Pre-Wash | Post-Wash |
| Diacetate  | 0.91 | 0.92 | 1.37 | 1.31 | 1.27 | 1.09 |
| Cotton     | 1.08 | 1.11 | 1.57 | 1.62 | 1.55 | 1.57 |
| Nylon-6,6  | 0.74 | 0.76 | 0.97 | 0.94 | 0.87 | 0.66 |
| Polyester  | 0.75 | 0.78 | 0.96 | 0.91 | 0.90 | 0.82 |
| Polyacrylic| 0.77 | 0.78 | 1.00 | 0.93 | 0.93 | 0.76 |
| Silk       | 0.98 | 1.02 | 1.30 | 1.29 | 1.17 | 1.00 |
| Viscose    | 1.04 | 1.08 | 1.49 | 1.49 | 1.46 | 1.26 |
| Wool       | 0.73 | 0.77 | 0.91 | 0.90 | 0.89 | 0.61 |

From these results, it is evident that the inventive colorant shows remarkable versatility in coloring a variety of fabrics and demonstrating excellent washfastness properties on such substrates.

Paper Dyeing/Printing

Each of the inks produced in EXAMPLEs 7–10 and 14–16 were filtered through a 1 micron filter paper and subsequently printed as solid rectangles covering most of an 8.5×11 inch sheet of Gilbert Bond paper. The paper was ink jet printed by a Hewlett Packard™ DeskJet™ 682C printer. The printed pages were tested for waterfastness by placing a single drop of water on the paper, holding it on the paper for 15 seconds, then allowing it to roll down the side of the paper. Waterfastness is a function of % color retention as measured by the optical density of the paper prior to and after the test. Jettability was also tested for each of the four inks. This test analyzes the ability of an ink to print continuously until the supply of ink is depeleted, or with repeated starts and stops, without clogging the nozzles. Precipitation or crusting resulting from an ink having a higher solids content may cause ink build up on the jet faces during the lifetime of the printer. The results of these tests are tabulated below:

TABLE 4

Waterfastness and Jettability on Paper

| Ink Composition | Optical Density Pre-Wash | Optical Density Post-Wash | Jettability | Waterfastness or % Color Retention |
|---|---|---|---|---|
| EXAMPLE 7 | 0.90 | 0.50 | GOOD | 50% |
| EXAMPLE 8 | 1.10 | 0.45 | GOOD | 25% |
| EXAMPLE 9 | 1.10 | 1.00 | GOOD | 91% |
| EXAMPLE 10 | 1.00 | 0.90 | GOOD | 90% |
| EXAMPLE 14 | 1.10 | 0.20 | GOOD | 18% |
| EXAMPLE 15 | 1.10 | 0.20 | GOOD | 18% |
| EXAMPLE 16 | 1.00 | 0.20 | GOOD | 20% |

From these results, it is evident that, although each of the Comparative EXAMPLEs obtained similar levels of jettability as the inventive colorants, improved color retention or waterfastness is obtained with the ink compositions comprising the colorants of this invention.

There are, of course, many alternative embodiments of the present invention which are intended to be included within the scope of the following claims.

What we claim is:

1. A compound comprising
   the addition product of
   (a) an organic chromophore having at least one reactive hydroxyl or amine substituent group;
   (b) a polyisocyanate; and
   (c) a carboxylic acid, sulfonic acid, or salt of either thereof having at least one reactive hydroxyl or amine substituent group; wherein
   said polyisocyanate reacts with each of said reactive hydroxyl or amine substituent groups to form isocyanate terminal groups on said organic chromophore and, subsequently, said carboxylic acid or salt thereof reacts with said isocyanate terminal groups to form urethane or urea moieties on the resulting compound.

2. The compound of claim 1 wherein
   said organic chromophore is selected from the group consisting essentially of azo, diphenylmethane, triarylmethane, xanthene, methine, acridine, quinoline, thiazole, indamine, indophenol, azine, oxazine, thiazine, anthraquinone, indigoid, and phthalocyanine chromophores.

3. The compound of claim 2 wherein
   said organic chromophore is selected from the group consisting essentially of azo, triarylmethane, xanthene, methine, and phthalocyanine chromophores.

4. The compound of claim 2 wherein
   said organic chromophore comprises at least one poly(oxyalkylene) substituent, having a straight or branched chain of from 3 to 200 residues of $C_2$–$C_4$ alkylene oxides.

5. The compound of claim 4 wherein
   said alkylene oxide residues are selected from the group consisting essentially of ethylene oxide, propylene oxide, and mixtures thereof.

6. The compound of claim 1 wherein
   said polyisocyanate is selected from the group consisting essentially of 2,4-toluene diisocyanate, 2,6-toluene diisocyanate, 4,4'-biphenylene diisocyanate, 2,2'-diphenylmethane diisocyanate, 4,4'-diphenylmethane diisocyanate, 2,4'-diphenylmethane diisocyanate, tetramethyl-m-xylene diisocyanate, p-xylene diisocyanate, methylenedi-p-phenyl diisocyanate, m-phenylene diisocyanate, p-phenylene diisocyanate, hexamethylene diisocyanate, isophorone diisocyanate, 4,4'-diisocyanatodiphenyl ether, bis(4-isocyanatophenyl)sulfone, isopropylidene bis(4-phenyl isocyanate), naphthalene-1,5-diisocyanate, 1-chloro-2,4-phenylene diisocyanate, 3,3'-bitolylene-4,4'-diisocyanate, 3,3'-dimethoxy-4,4'-biphenylene diisocyanate, 3,3'-dichloro-4,4'-biphenylene diisocyanate, 2,2',5,5'-tetramethyl-4,4'-biphenylene diisocyanate, diphenylethane-4,4'-diisocyanate, dicyclohexylmethane-4,4'-diisocyanate, and mixtures thereof.

7. The compound of claim 6 wherein
   said polyisocyanate is selected from the group consisting essentially of tetra methyl xylene diisocyanate, isophorone diisocyanate, and mixtures thereof.

8. The compound of claim 1 wherein
   said carboxylic or sulfonic acid is selected from the group consisting essentially of glycolic acid, imino diacetic acid, citric acid, 4-hydroxybenzene sulfonic acid, 4-hydroxybenzoic acid, isethionic acid, lithocholic acid, syringic acid, 2,4,5-trichlorophenoxyacetic acid, 4-hydroxybenzoic acid, 5-hydroxyanthranilic acid, 2-hydroxyisobutyric acid, 5-hydroxyisophthalic acid, 1-naphthol-3,6-disulfonic acid, 4-hydroxy-1-naphthalene sulfonic acid, 3-hydroxy-2-naphthoic acid, 8-hydroxyquinoline-5-sulfonic acid, hydroxylamine-o-sulfonic acid, hydroxymethanesulfinic acid, 3-allyloxy-2-hydroxy-1-propane sulfonic acid, 4-hydroxyanthranilic acid, and mixtures thereof.

9. An ink solution comprising
   from about 0.01 to about 90% of the compound of claim 1;
   from about 10 to about 99% of a diluent;
   from about 0.1 to about 10.0% of a binder; and
   from 0 to about 7% of a surfactant.

10. The ink solution of claim 9 wherein
    said diluent is selected from the group consisting essentially of water, alcohols, ketones, acetates, glycols, glycol ethers, and mixtures thereof.

11. The ink composition of claim 10 wherein
    said diluent is diethylene glycol, dipropylene glycol, and mixtures thereof.

12. A process for producing a colorant compound comprising the sequential steps of
    (a) providing an organic chromophore having at least one reactive hydroxyl or amine substituent group;
    (b) adding, in excess of at least twice the molar equivalent, in relation to the number of reactive hydroxyl or amine groups on said organic chromophore, of at least one polyisocyanate, wherein said polyisocyanate reacts with each of said reactive hydroxyl or amine substituent groups to provide isocyanate terminal groups on said organic chromophore; and
    (c) adding, in excess of the molar equivalent, in relation to the number of terminal isocyanate groups on said organic chromophore, of a carboxylic acid, sulfonic acid, or salt of either thereof having at least one reactive hydroxyl or amine substituent group, wherein said carboxylic acid or salt thereof reacts with said isocyanate terminal groups to form urethane or urea moieties on the resulting colorant.

13. The process of claim 12 wherein
    said organic chromophore is selected from the group consisting essentially of azo, diphenylmethane, triarylmethane, xanthene, methine, acridine, quinoline, thiazole, indamine, indophenol, azine, oxazine, thiazine, anthraquinone, indigoid, and phthalocyanine chromophores.

14. The process of claim 13 wherein said organic chromophore is selected from the group consisting essentially of azo, triarylmethane, xanthene, methine, and phthalocyanine chromophores.

15. The process of claim 13 wherein said organic chromophore comprises at least one poly(oxyalkylene) substituent, having a straight or branched chain of from 3 to 200 residues of $C_2$–$C_4$ alkylene oxides.

16. The process of claim 15 wherein said alkylene oxide residues are selected from the group consisting essentially of ethylene oxide, propylene oxide, and mixtures thereof.

17. The process of claim 12 wherein said polyisocyanate is selected from the group consisting essentially of 2,4-toluene diisocyanate, 2,6-toluene diisocyanate, 4,4'-biphenylene diisocyanate, 2,2'-diphenylmethane diisocyanate, 4,4'-diphenylmethane diisocyanate, 2,4'-diphenylmethane diisocyanate, tetramethyl-m-xylene diisocyanate, p-xylene diisocyanate, methylenedi-p-phenyl diisocyanate, m-phenylene diisocyanate, p-phenylene diisocyanate, hexamethylene diisocyanate, isophorone diisocyanate, 4,4'-diisocyanatodiphenyl ether, bis(4-isocyanatophenyl)sulfone, isopropylidene bis(4-phenyl isocyanate), naphthalene-1,5-diisocyanate, 1-chloro-2,4-phenylene diisocyanate, 3,3'-bitolylene-4,4'-diisocyanate, 3,3'-dimethoxy-4,4'-biphenylene diisocyanate, 3,3'-dichloro-4,4'-biphenylene diisocyanate, 2,2',5,5'-tetramethyl-4,4'-biphenylene diisocyanate, diphenylethane-4,4'-diisocyanate, dicyclohexylmethane-4,4'-diisocyanate, mixtures thereof.

18. The process of claim 17 wherein said polyisocyanate is selected from the group consisting essentially of tetra methyl xylene diisocyanate, isophorone diisocyanate, and mixtures thereof.

19. The process of claim 12 wherein said carboxylic acid is selected from the group consisting essentially of glycolic acid, imino diacetic acid, citric acid, 4-hydroxybenzene sulfonic acid, 4-hydroxybenzoic acid, isethionic acid, 5-hydroxyisophthalic acid, 4-hydroxyanthranilic acid, and mixtures thereof.

20. A printed substrate selected from the group consisting essentially of a textile, a polymeric film, and a paper, contacted with the compound of claim 1.

21. A method of coloring a paper, polymeric film, or textile substrate comprising the steps of (a) providing a paper, polymeric film, or textile substrate;

(b) contacting at least a portion of said substrate with the compound of claim 1; and (c) heating said contacted substrate to a temperature and for a period of time sufficient to effectively fix said compound to the surface of said textile substrate.

* * * * *